United States Patent [19]

Matsui et al.

[11] Patent Number: 5,401,447
[45] Date of Patent: Mar. 28, 1995

[54] PROCESS FOR PRODUCING CELLUOSE MOLDINGS

[75] Inventors: Toshihiko Matsui, Hirakata; Chihiro Yamane, Nobeoka, both of Japan

[73] Assignee: Asahi Kasei Kogyo Kabushiki Kaisha, Osaka, Japan

[21] Appl. No.: 87,798

[22] PCT Filed: Nov. 19, 1992

[86] PCT No.: PCT/JP92/01514

§ 371 Date: Nov. 4, 1993

§ 102(e) Date: Nov. 4, 1993

[87] PCT Pub. No.: WO93/10171

PCT Pub. Date: May 27, 1993

[30] Foreign Application Priority Data

Nov. 19, 1991 [JP] Japan .................................. 3-303214

[51] Int. Cl.$^6$ ...................... B29C 35/16; B29C 47/00; D01D 5/06; D01F 2/02
[52] U.S. Cl. .................................... 264/28; 264/187; 264/210.8; 264/211.11; 264/211.17; 264/211.2; 264/235; 264/288.8; 264/290.5
[58] Field of Search ...................... 264/28, 187, 210.8, 264/211.11, 211.12, 211.17, 211.2, 235, 288.8, 290.5

[56] References Cited

U.S. PATENT DOCUMENTS 1,881,740  10/1932  Lilienfeld ........................ 264/28 X
2,169,207   8/1939  Lilienfeld et al. ................ 264/28 X

FOREIGN PATENT DOCUMENTS 61-36082    8/1986  Japan .
62-240328  10/1987  Japan .
62-240329  10/1987  Japan .

*Primary Examiner*—Leo B. Tentoni
*Attorney, Agent, or Firm*—Finnegan, Henderson, Farabow, Garrett & Dunner

[57] ABSTRACT

A method for producing a cellulose shaped article characterized by causing cellulose dope substantially composed of an alkali soluble cellulose and an aqueous alkali solution having an alkali concentration of 5 to 15% by weight to coagulate in an aqueous acidic solution having a temperature of at least the freezing temperature and less than 20° C., then drawing the resultant solid 1.05 fold to less than 2.0 fold, then performing heat treatment. It is possible to provide a process free from the generation of waste gas and the danger of explosion during the molding process and also free from environmental pollution and it is possible to provide a cellulose shaped article having mechanical properties of the same extent of existing cellulose shaped articles in terms of physical properties.

6 Claims, No Drawings

PROCESS FOR PRODUCING CELLUOSE MOLDINGS

TECHNICAL FIELD

The present invention relates to a method for producing regenerated cellulose shaped articles, such as a fiber, a film, or a fine powder (or finely divided particle).

BACKGROUND ART

In general, cellulose shaped articles (fiber, film, powder) are produced by mixing a solution, prepared by dissolving cellulose into a solvent by a certain type of method, into a nonsolvent. The methods for dissolving cellulose now used industrially for the above object include two methods: the viscose method found around 100 years ago (late 1890) wherein solid state alkali-cellulose is made by causing an around 20% aqueous alkali solution to act on the cellulose, causing carbon disulfide to react with this, then dissolving in an alkali and the cuprammonium method in which the cellulose is dissolved in a cuprammonium solution. The cellulose molecules in the solutions obtained by these methods do not dissolve in the form of cellulose, but dissolve as a certain cellulose derivative (cellulose xanthate in the viscous method and a cellulose cuprammonium complex in the cuprammonium method). Accordingly, when a cellulose shaped article is manufactured, it is necessary to use regeneration, i.e., a process in which the cellulose derivative is returned to cellulose, in addition to coagulation. For example, when producing a regenerated cellulose fiber, it has been known up to now that the setting of the conditions in the regeneration process is an important factor determining the physical properties of the obtained fiber. Thus, studies have been made to optimize the coagulating and regenerating conditions, aiming at superior physical properties, from various viewpoints, such as improvement of the dope, coagulation conditions (composition of coagulating bath, temperature of coagulation, length of coagulating bath, bath flow, nozzle). For example, mention can be made of the method of using a Müller bath, the polynosic method, the HW modulus method, the high tenacity rayon method, the Lilienfeld method using a concentrated sulfuric acid for the coagulating bath, etc. for the viscose rayon method and the free fall and stretch spinning method etc., for the cuprammonium method. In addition, as a method of dissolving cellulose, studies have focused on cadoxens (cadmium/ethylenediamine/alkali), nioxens (nickel/ethylenediamine/alkali), EWNN (iron/tartaric acid/alkali), and other metal complexes, but these are not superior to the cuprammonium method and the viscose method in terms of safety and economy. Also, neither of the above methods can avoid the generation of toxic gases or discharge of heavy metals in the process of preparation of the solutions or the process of production of the shaped articles, and therefore, have problems when viewed from the standpoint of the work environment or the global environment.

That is, (1) these make use of carbon disulfide and ammonium, which have an adverse effect on the human body, and these have explosive limits. (2) They include copper, which is a heavy metal, and produce harmful waste gas in the processes of dissolution/coagulation/regeneration/scouring, so a vast amount of energy and water are required for their reclamation/purification/disposal, the process becomes longer, and the facilities become longer and larger. (3) Due to (1) and (2), the regenerated cellulose fiber industry must inevitably become a labor-intensive type production style.

On the other hand, voices arose, mostly in the West, from the 1960s to the 1970s warning of the continued industrial use of traditional techniques like the viscose method and the cuprammonium method. The first wave of this which appeared most remarkably was with the pullout of many companies from the viscose rayon business. The second wave has been with the now under way movement toward restriction of discharge and the prohibition of use of harmful substances due to the global scale environmental problems, such as seen in the Environmental Summit. With the above as a background, research has been under way since the 1970s, primarily in Canada and the United States, reevaluating the existing method of dissolution of cellulose and calling for obtaining novel regenerated cellulose shaped articles by dissolving cellulose directly in an organic solvent so as to close off the fiber and film producing process. As a result, numerous methods of dissolution have actually been discovered, but all of these use solvents and salts comprised of complicated, numerous components. Due to the higher costs, toxicity, explosiveness, difficulties of solvent recovery, etc., of the solvent itself, there have been very few actual cases of commercialization (industrialization) of these. Further, these newly discovered methods of dissolution almost all convert the cellulose into a certain form of derivative and then dissolve that derivative in a suitable solvent, so in that sense are not greatly different technically speaking from the viscose method or the cuprammonium method in any way. In this way, in the case of spinning cellulose by an organic solvent, there is the advantage that no use is made of heavy metals or volatile gases, but there are the serious problems from the industrial viewpoint that (1) most methods are accompanied with chemical reactions at the time of dissolution, and therefore, so in the dissolved state, the cellulose is dissolved in the form of a derivative and either byproducts (modifications of the solvent itself) are produced at the time of regeneration or regeneration is not possible and the shaped article ends up comprised of the cellulose derivative as it is, (2) since the solvent itself is high in price, a high reclamation rate is required or since most solvents have high boiling points, the energy costs become higher and further loss is unavoidable due to the denaturation accompanying the reaction/regeneration, (3) the solvent itself is highly toxic and explosive, etc.

On the other hand, running counter to these trends, as shown in Japanese Unexamined Patent Publication No. 62-240328 and 62-620329, two or three attempts are being made to produce cellulose shaped articles by environmental-friendly processes. These disclose methods for producing cellulose shaped articles nonpollutingly, i.e., the cellulose is subjected to physical treatment such as steam explosion treatment to make it soluble in alkali, then is dissolved in an aqueous alkali solution and wet molded, with no use of carbon disulfide, heavy metals, organic solvents, or other harmful substances at all. The control of the cohesive structure during the coagulation, for example, the control for achieving a fine cohesion during coagulation or deformation of the coagulating gel, is extremely difficult, however, and the physical properties of the resultant cellulose shaped articles also were not fully satisfactory.

This suggests that, basically, in the case of using a dope comprised of just a cellulose and an alkali, the structural control in the molding process is difficult since there is no regeneration process, which had been an important factor in the control of physical properties in the shaping process based on conventional methods (viscose method and cuprammonium method).

DISCLOSURE OF THE INVENTION

The object of the present invention is to provide a method for producing a cellulose shaped article having excellent physical properties without using toxic gases, heavy metals, or other harmful substances. That is, the task of the present invention is to provide a next generation method for producing a cellulose shaped article which is sufficiently satisfiable when seen from the industrial perspective and the perspective of environmental problems.

The present invention is characterized by causing a cellulose dope substantially comprised of an alkali soluble cellulose and an alkaline aqueous solution of 5 to 15% by weight to coagulate in an acidic aqueous solution under specific conditions, i.e., having a temperature of at least the freezing temperature and less than 20° C. then drawing and suitably thereafter performing heat treatment.

Further, the present invention is characterized by making the internal structure of the shaped article sufficiently fine in the process of wet molding the dope, comprised of cellulose dissolved in an alkaline aqueous solution. Here, the "internal structure" includes two meanings of a solid structure and higher order structure. Here, "solid structure" means a crystal structure, amorphous structure, hydrogen bonding property, degree of molecular orientation, etc. and is evaluated by methods such as wide angle X-ray diffractometry, solid NMR, and birefringence. Further, the "higher order or dimensional structure" means a structure of a dimension on an order higher than a solid structure and indicates the presence of voids in the solid, the distribution of the same, and the rest of the cohesive structure. These are primarily evaluated by observation through an electron microscope, small angle X-ray scattering, etc., (when the samples covered here are wet, the higher order structure changes in the drying process, so it is necessary to use techniques such as freeze drying and critical point drying, it goes without saying).

The coagulated material which is wet molded by an acidic aqueous solution frequently includes a large amount of a coagulating agent of 4 times or more, based upon the cellulose and is loose in internal structure. This is subjected to drawing at a ratio of 1.05 or more, but in the process the coagulating agent in the coagulated material is exhausted to the outside and the internal structure becomes finer. Further, the molecular chains of the inside amorphous region are oriented in the drawing direction, when compared with those before the drawing, and accordingly, the microcrystals are oriented in the drawing direction. The fineness of structure and the molecular orientation both serve to increase the tensile strength of the shaped article and improve its physical properties. Here, a similar effect can be obtained by the same mechanism even if drawing is applied after washing part or all of the coagulated material.

Here, attention is required in that application of apparent elongation does not always cause the above effect in any circumstances. For example, even if simultaneous with the extrusion into the coagulating bath the coagulated material is taken up at a speed faster than the extrusion speed, that is, a so-called high "draft" (linear speed of extrusion from spinnerett (takeup speed of coagulated material from coagulating bath)) is applied, deformation is only applied to the liquid dope before becoming the coagulated material. This deformation does not exhibit the effect of improvement of the physical properties like drawing in the present invention by any means. In other words, the so-called "draft" in spinning does not correspond to the "drawing after coagulation" in the present invention.

The shaped article thus obtained may be rinsed, then heated to dry, but when the dry strength, wet strength, and wet modulus of elasticity have to be further controlled, by applying heat treatment to the shaped article in the presence of a plasticizer at the time of heating and drying, it is possible to cause reorientation of the molecular chains and increase the completeness of the solid structure of the final shaped article.

The alkali soluble cellulose used in the method of the present invention is preferably cellulose with a solubility of at least 90% with respect to an aqueous alkali solution having a concentration of 5 to 15% by weight under low temperature. For example, the cellulose disclosed in Japanese Unexamined Patent Publication No. 60-42401 and Japanese Unexamined Patent Publication No. 62-116601 may suitably be used. Further, if soluble in an aqueous alkali solution at low temperature, even a cellulose derivative with a low degree of substitution is acceptable. The degree of substitution is preferably 0.2 or less. The substituent group is suitably, for example, a methyl group, ethyl group, hydroxyethyl group, hydroxypropyl group, cyanoethyl group, carboxymethyl group, etc., but use may be made of any other substituent group as well. Further, one or more of these substituent groups may be included.

Further, the degree of polymerization of the cellulose is preferably a minimum of 100 or more in view of the physical properties of the shaped article obtained, the procedures during molding, etc. On the other hand, the concentration of the cellulose is something which should be determined by the degree of polymerization of the cellulose and the composition of the solvent, but a content of at least 3% by weight is preferable from the economic viewpoint and the physical properties of the resultant shaped article. As the solvent, that is, the aqueous alkali solution, use may suitably be made of an aqueous solution of an alkali hydroxide such as sodium hydroxide or lithium hydroxide. In this case, the concentration of the aqueous alkali solution is 5 to 15% by weight. The suitable concentration changes depending upon the type of the aqueous alkali solution, but in the case of sodium hydroxide, 7 to 10% by weight is suitably used. The dissolution is performed at 16° C. or less, preferably between $-10°$ C. and 10° C. Further, if necessary, a third component, for example, a metal oxide (e.g., titanium oxide, zinc oxide), a surfactant, a cross-linking agent, an alkali soluble polymer, etc., may be added as well.

The alkali solution of cellulose obtained by the above method (hereinafter referred to simply as the "dope") is molded using, as a coagulating bath, an aqueous acid solution of a temperature of less than 20° C. and preferably a concentration of at least 0.5N but less than 15N. As the acid comprising the acidic aqueous solution, use may be made of anhydrous sulfuric acid, sulfuric acid, halogenated sulfuric acid, thiosulfuric acid, sulfurous acid, hydrochloric acid, hydrobromic acid, hydrofluoric acid, nitric acid, phosphoric acid, pyrophosphoric acid, metaphosphoric acid, polyphosphoric acid, hypophosphoric acid, acetic acid, trifluoroacetic acid, or the like. Use may be made of one or more acids selected from among these. Of course, it is also possible to add salts to these aqueous solutions. The suitable concentration of the aqueous acidic solution differs depending on the type of the acid used and the coagulation temperature, so cannot be defined across the board, but when less than 0.5N, the coagulating power is weak and the coagulation speed is slow, and therefore, this is not preferable from the viewpoint of spinnability in the case of forming a fiber. On the other hand, if exceeding 15N, a decomposition action on the cellulose, a dissolution action, or a denaturing action is exhibited, the viscosity becomes higher due to the great thickness, there are problems in the handling and recovery due to the generation of fumes etc., so this is not preferable in practice. In fact, considering economy and practicality, suitable use is made of a 5% by weight to 80% by weight aqueous solution of sulfuric acid. The temperature of the coagulating bath at the time of molding does not unilaterally govern the physical properties, and therefore, is difficult to limit, but preferably is less than 15° C. as it facilitates an increase in the drawable ratio, the fineness of the internal structure in the case of drawing, and an increase in the improvement of the physical properties. When the coagulating bath freezes, it goes without saying that it cannot be used as a coagulating bath, and therefore, use at above the freezing temperature is a precondition. Further, depending on the molding method, before the start of the coagulation, sometimes the heat of the dope is robbed by the coagulating bath so the dope freezes, which is unsuitable, but this largely depends on the method of coagulation, so the lower limit is not clearly defined from this viewpoint. On the other hand, room temperature or more, for example, 40° C. or more, the chains of cellulose molecules are broken due to the hydrolysis action of the coagulating agent or gelation of the dope itself occurs, although this depends on the molding method, and therefore, this is not preferable.

After causing coagulation by the aqueous acidic solution, the coagulated material may be drawn by various methods. For example, in the case of continuous treatment, suitable use may be made of the methods of successively bring a continuous coagulated material into contact with a pair of rolls with different circumferential speeds, successively passing it between two pairs of nip rolls having different circumferential speeds, causing a continuous coagulated material running at a fixed speed to come into contact with another object to cause a difference in speed before and after the object due to the frictional resistance, etc. When the coagulated material is a fiber, strand, tape, or something else with a remarkably larger L/D, it is possible to apply drawing by spirally winding it on a pair of rolls and gradually moving it to a position of a greater diameter. Further, the drawing does not necessarily have to be continuous. For example, the coagulated material may be gripped at its two ends by a suitable method and given stress.

The drawing ratio should be at least 1.05. The upper limit depends on the coagulation conditions (e.g., composition of coagulating agent, temperature of coagulation, nozzle diameter, etc.,) and the spinning method etc., so it is difficult to define it across the board, but drawing at a ratio of 1.1 to 2.0 is suitably used. When less than 1.05, the dehydration effect from the coagulated material is insufficient and the orientation due to the drawing is not improved, and therefore, this is not preferable. Further, the maximum drawable ratio can change depending on the coagulation and spinning methods, but when drawing at a ratio of 2 or more, frequent breakage (filament breakage in the case of fibers and tearing in the case of film) occur and damage occurs in the internal structure, so conversely the physical properties deteriorate in some cases. The temperature at the time of drawing is not particularly limited. Further, a bath of a different composition and temperature as the coagulating bath may be provided and the drawing performed in that bath. Depending on the selection of the bath, the maximum drawing ratio may be increased and the physical properties improved further.

According to the present invention, there are no particular limitations to the wet molding method. It is sufficient if the usual method is performed. For example, when forming fibers, use may be made of any spinning method, such as a stationary bath, fluid bath, air gap spinning, etc. using a wet nozzle or hollow filament use nozzle having the usual fine holes. Further, regarding the film-forming method, the film stock solution may be cast on a support plate like a glass plate using an applicator or knife coater, then caused to coagulate in the above-mentioned aqueous acidic solution. Of course, a slit nozzle may be used for direct extrusion into a coagulating bath as well.

The cellulose shaped article coagulated/drawn according to this method is subjected next to heat treatment to become the final shaped article. The effect of the heat treatment of the present invention is to cause reorientation of the molecular chains by the plasticizer, heat, shrinkage strain, etc. and increase the completeness of the solid structure and thereby increase the wet strength and wet modulus of elasticity of the final product.

The heat treatment is ordinarily performed in the presence of water, an aqueous alkali solution, a pH buffer solution, glycerine or another plasticizer at a temperature of from 80° C. to 250° C. At a heat treatment temperature of less than 80° C., the effect is small, while when over 250° C., the cellulose easily breaks down. More preferably, the treatment is performed at a temperature from 100° C. to 200° C. The longer the treatment time, the greater the effect. The treatment time may be set as desired in accordance with the desired physical properties, for example, the wet strength and the wet modulus of elasticity. In the case of a high temperature, however, the cellulose easily breaks down, so the treatment time is limited. For example, in the case of a temperature of 120° C., there is no problem when the treatment time is 180 minutes or less, but this time becomes shorter as the temperature rises. The amount of the plasticizer used is preferably at least 10% by weight with respect to the cellulose, more preferably from 20% by weight to less than 100% by weight. When the plasticizer is 100% by weight or more, the degree of swelling of the shaped article falls, but the amount of increase of the wet strength is small.

As the means for performing the heat treatment, for example, use may be made of steam, glycerine, silicone oil, metal rolls, microwaves, air, infrared rays, and any other medium able to heat cellulose to 100° C. or more, but usually use is made of steam or glycerine. Two or more of these means may be combined, when necessary.

For example, in the case of coagulated/drawn yarn, heat treatment is performed on a metal roll heated in the presence of water, but the time of residence at a moisture content of 10% by weight to less than 100% by weight is short, so the effect is small. Therefore, if desiring to further improve the physical properties, joint use may be made of steam treatment etc. As the steam treatment, mention may be made of saturated steam and superheated steam treatment.

In the case of heat treatment by saturated steam, ordinarily the saturated steam is directly blown into the autoclave (i.e., batch treatment). Cellulose shaped articles are heat treated in the tension state or the nontension state. Heat treatment in the tension state, however, is more effective, and therefore, is more preferable. Further, continuous processing is also possible. When air dried cellulose shaped articles are treated by saturated steam, since the moisture content of the shaped articles during the treatment falls from 30% by weight to 100% by weight, when the plasticizer is water, the control of the moisture content is easy.

When heat treating using superheated steam, there is the advantage that the treatment pressure can be made lower than that in the case of saturated steam, assuming the same temperature, which is advantageous in the case of continuous heat treatment. In the case of a high degree of superheating, the evaporation of water from the shaped article is remarkable, and therefore, it is better to adjust the moisture content of the shaped article higher in advance so that the concentration of the plasticizer during the treatment becomes the desired concentration.

Glycerol has a high boiling point, so can be heat treated at ordinary temperature, therefore when glycerin is the plasticizer, it is possible to perform the heat treatment by a heating roll, heating plate, etc.

Even if similar heat treatment is applied to rayon yarn obtained from a viscose method (made by Asahi Chemical Industry Co. Ltd., 75 denier, 26 filaments) and rayon yarn of the cuprammonium method (made by Asahi Chemical Industry Co. Ltd., 75 denier, 40 filaments), only a reduction in the degree of swelling was observed. There was almost no change in the wet strength and the wet modulus of elasticity.

BEST MODE FOR CARRYING OUT THE INVENTION

The present invention will now be explained using examples, but it is clear that the invention is not limited by these examples. Note that the physical properties were measured as follows:

The mechanical properties (i.e., strength, elongation, and modulus of elasticity) of the fiber and film were measured using a tensile tester "Tensilon" made by Orientec. The measurements were performed in accordance with the Japanese Industrial Standard (JIS) L1013-1981 (Test Methods for Chemical Fiber Filaments). In the case of film, the film was cut into short strips of 1 cm width and measured in sample lengths of 10 cm. In this case, the physical properties were expressed by values per unit square area ($mm^2$).

Examples 1 to 3 and Comparative Examples 1 and 2

One hundred parts of a softwood pulp (Alaska Pulp) having a polymerization degree of 1300 were immersed in 1000 parts of water for 3 hours, then were squeezed by a dehydrator to obtain 180 parts of water-containing cellulose. This water-containing cellulose was steam treated at 235° C. for 25 seconds using a steam explosion apparatus (made by Nihon Kagaku Kikai) to obtain a cellulose having a degree of polymerization of 326 and soluble in an aqueous alkali solution. One hundred grams of this cellulose were dissolved in 1900 g of a 7.8% by weight aqueous solution of sodium hydroxide at 4° C. using a homogenizer to obtain a uniform dope. The solubility of the cellulose was 99%. The resultant dope was filtered using two 200 mesh metal nets and one polyamide nonwoven fabric, then was allowed to stand at 5° C. to be degassed. The resultant dope was used as the spinning stock solution. The spinning stock solution was extruded from a nozzle with 50 holes of 0.05 mm$\phi$ into a coagulating bath comprised of a 20% aqueous solution of sulfuric acid having a temperature of $-12°$ C. (immersion length: 50 cm). After the filaments was taken up from the coagulating bath, the circumferential speeds (m/min) of a first Nelson roll (NR1) and a second Nelson roll (NR2) were changed as shown in Table 1 to change the drawing ratios. After drawing, the fibers were sufficiently washed with water, then were heat treated using a 120° C. metal roll at 120° C. and were taken up on a bobbin at 20 m/min. Table 1 shows the spinning conditions and the physical properties. As clear from Table 1, when compared with the case of the drawing ratio of 1.0, the higher the drawing ratios, that is, 1.1, 1.3, and 1.6 times, the more improved the dry strength and the wet strength were, it was found. When the drawing ratio became 2.0, the frequent breaks occurred in the yarn during the drawing process and the stable sampling was not possible.

Further, constant lengths of the fibers obtained by the above method were placed in an autoclave and heat treated with saturated steam having a temperature of 120° C. for 15 minutes. As learned from the results shown in Table 1, treatment by saturated steam is an effective means for improving the wet modulus. It is necessary to select the efficient heat treatment means according to the desired physical properties. As the wet strength, in practice there is no problem at all for fibers for apparel use when the strength is 0.6 g/d or more.

TABLE 1

| Relationship Between Spinning Conditions and Physical Properties | | | | | |
|---|---|---|---|---|---|
| | Comp. Ex. 1 | Ex. 1 | Ex. 2 | Ex. 3 | Comp. Ex. 2 |
| Spinning draft | 0.86 | 0.78 | 0.66 | 0.54 | 0.43 |
| Circumferential speed of NR1 (m/min) | 20.0 | 18.2 | 15.4 | 12.5 | 10.0 |
| Circumferential speed of NR2 (m/min) | 20.0 | 20.0 | 20.0 | 20.0 | 20.0 |
| Drawing ratio | 1.0 | 1.1 | 1.3 | 1.6 | 2.0 |
| Before steam treatment | | | | | |
| Dry strength (g/d) | 1.56 | 1.83 | 2.02 | 2.16 | — |
| Wet strength (g/d) | 0.40 | 0.66 | 0.78 | 0.89 | — |
| Wet modulus (g/d) | 3.4 | 5.0 | 5.8 | 6.2 | — |
| After steam treatment | | | | | |
| Dry strength (g/d) | 1.59 | 1.82 | 2.07 | 2.15 | — |
| Wet strength (g/d) | 0.57 | 0.70 | 0.81 | 0.92 | — |
| Wet modulus (g/d) | 5.9 | 9.4 | 10.7 | 13.5 | — |

Examples 4 to 6 and Comparative Examples 3 and 4

One hundred parts of a softwood pulp (Alaska Pulp) having a degree of polymerization of 1300 were immersed in 1000 parts of water for 3 hours, then were squeezed by a dehydrator to obtain 190 parts of water-containing cellulose. This water containing cellulose was steam treated at 235° C. for 25 seconds using a steam explosion apparatus (made by Nihon Kagaku Kikai) to obtain a cellulose having a degree of polymerization of 340 and soluble in an aqueous alkali solution. One hundred grams of this cellulose were dissolved in 1900 g of an 8% by weight aqueous solution of sodium hydroxide at 5° C. using a homogenizer to obtain a uniform dope. The solubility of the cellulose was 97%. The resultant dope was filtered using two 300 mesh metal nets and two polyamide nonwoven fabrics, then was allowed to stand to be degassed. The result was used as the spinning stock solution. The spinning stock solution was extruded using an extruder equipped with a gear pump from a nozzle with 100 holes of 0.06 mm$\phi$ into a coagulating bath comprised of the concentrations of sulfuric acid shown in Table 2 at an extrusion rate of 5.65 ml/min. The temperature of the coagulating bath was −10° C. Coagulation was performed under conditions of an immersion length of 25 cm from a sulfuric acid concentration of 3 to 40% by weight and an immersion length of 15 cm from a sulfuric acid concentration of 65 to 85% by weight, then the fiber was drawn by a ratio of 1.2 between two Nelson rolls, passed through a rinsing step, dried on a hot roll of 120° C., then taken up at 24 m/min on a bobbin. Next, the fiber was treated in saturated steam while running the filaments continuously. The treatment temperature was 120° C. The treatment was performed for 30 seconds and then the fiber was again taken up on a bobbin at 5 m/min.

Table 2 shows the coagulation conditions and the resultant physical properties. The spinnability was evaluated by judgment by the naked eye and divided into three classes: good (○), somewhat poor (Δ), and failure of fiber formation (×). Except in the cases of a sulfuric acid concentration of 3% and 85%, the spinnability was excellent. As is clear from the table, according to the present invention, it is possible to obtain fiber equal to the existing regenerated cellulose fibers in physical properties (dry strength, dry elongation) and the fibers can be fully used for apparel.

TABLE 2

Relationship Between Concentration of Sulfuric Acid and Structure/Physical Properties

|  | Comp. Ex. 3 | Ex. 4 | Ex. 5 | Ex. 6 | Comp. Ex. 4 |
|---|---|---|---|---|---|
| Concentration of sulfuric acid (%) | 3 | 20 | 40 | 65 | 85 |
| Spinnability | Δ | ○ | ○ | ○ | × |
| Dry strength (g/d) | 1.37 | 2.32 | 1.96 | 2.15 | — |
| Dry elongation (%) | 7.8 | 9.9 | 11.0 | 14.2 | — |
| Wet strength (g/d) | 0.39 | 0.85 | 0.79 | 0.82 | — |

Examples 7 to 9 and Comparative Examples 5 and 6

One hundred parts of a softwood pulp (Alaska Pulp) having a degree of polymerization of 1300 were immersed in 1000 parts of water for 3 hours, then were squeezed by a dehydrator to obtain 190 parts of water-containing cellulose. This water-containing cellulose was steam treated at 235° C. for 25 seconds using a steam explosion apparatus (made by Nihon Kagaku Kikai) to obtain a cellulose having a degree of polymerization of 340 and soluble in an aqueous alkali solution. This cellulose was mixed with an aqueous solution of sodium hydroxide at 5° C. to obtain a uniform dope of a concentration of sodium hydroxide of 8% by weight. The solubility of the cellulose was 97%. The resultant dope was filtered using two 300 mesh metal nets and two polyamide nonwoven fabrics, then was allowed to stand to be degassed. The result was used as the spinning stock solution. The spinning stock solution was extruded from a nozzle with 100 holes of 0.08 mm$\phi$ into a coagulating bath comprised of a 25% by weight aqueous solution of sulfuric acid using an extruder equipped with a gear pump. The coagulation temperature was changed from −20° C. to 25° C. as shown in Table 3 to cause coagulation under conditions of an immersion length of 45 cm, then the fiber was drawn by a ratio of 1.2 between a first Nelson roll and a second Nelson roll, was sufficiently scoured by washing with cold water and washing with hot water, then was heat treated on a hot roll of 120° C. and was taken up on a bobbin at 72 m/min. A constant length of part of the resultant fiber was placed in an autoclave and heat treated for 15 minutes with saturated steam having a temperature of 110° C. Table 3 shows the relationship between the physical properties of the fiber and the coagulating bath temperature. When the coagulating bath temperature was −20° C., some of the dope froze in the coagulating bath, so the structure was formed with the coagulated structure ending up not that fine, and the fiber had poor physical properties. On the other hand, when the coagulation temperature was 25° C., no transparency could be found in the coagulated filaments in the coagulating bath, so it is believed that this worked to the detriment of the formation of the drawable coagulating gel. That is, it is deduced that, when the temperature of the coagulating bath is high, the solidification through gelation progresses and the drawability becomes poor and in turn the effects of drawing and dehydration become poor. By way of reference, the Table also includes, as a measure of the drawability, the drawing ratios up until yarn breakage occurs for higher circumferential speeds of the second Nelson roll, as drawable ratios. In this way, it is learned that the drawable ratio is very susceptible to the effects of the temperature of the coagulating bath. On the other hand, in the case of the present invention, the coagulating filaments in the coagulating bath have a high transparency and it was confirmed that drawable coagulating gel filaments were being formed. As is clear from Table 3, with the method of the present invention, the lower the temperature of the coagulating bath, the better the physical properties. Further, in the heat treatment, fiber could be obtained having high physical properties even with treatment on a hot roll, but it was learned that a steam treatment could be further performed when fibers having even better physical properties were desired.

TABLE 3

Relationship Between Coagulating Temperature and Physical Properties

|  | Comp. Ex. 5 | Ex. 7 | Ex. 8 | Ex. 9 | Comp. Ex. 6 |
|---|---|---|---|---|---|
| Coagulating bath temperature (°C.) | −20 | −15 | −5 | 10 | 25 |
| Before steam treatment |  |  |  |  |  |
| Dry strength (g/d) | 0.85 | 2.24 | 1.98 | 1.76 | 1.47 |
| Wet strength (g/d) | 0.32 | 0.89 | 0.80 | 0.71 | 0.48 |
| After steam treatment |  |  |  |  |  |
| Wet strength (g/d) | 0.36 | 0.93 | 0.90 | 0.77 | 0.54 |
| Wet modulus (g/d) | 4.0 | 9.8 | 9.2 | 9.0 | 4.9 |
| Drawable ratio | 1.2 | 1.8 | 1.9 | 1.5 | 1.3 |

Example 10

Three hundred parts of wood pulp having a degree of polymerization of 1060 were immersed in 6000 parts of water for 15 minutes, then centrifuged to adjust the moisture content to 120%. Then, the water-containing cellulose was treated by a steam explosion apparatus (made by Nihon Kagaku Kikai) to obtain three types of cellulose with different alkali solubilities. The cellulose 1, cellulose 2, and cellulose 3 were treated for 30 seconds with saturated steam of 2.9 Megapascals, 160 seconds with saturated steam of 2.9 Megapascals, and 30 seconds with saturated steam of 4.9 Megapascals. The degrees of polymerization were 392, 235, and 312 by the cadoxen viscosity method. Five grams of each of these celluloses were dispersed in 95 grams of a 9.1% by weight aqueous solution of sodium hydroxide of 4° C. and were agitated to dissolve by a home mixer. The resultant solutions were allowed to stand at 4° C. for 8 hours, then they were agitated again for dissolution. The solutions were centrifugally separated at 7500 rpm for 1 hour to separate the portions with fluidity and the portions precipitated. Portions of a 1.3% by weight aqueous solution of hydrochloric acid were added to the precipitated portions to neutralize the cellulose portions and cause reprecipitation. The portions of re-precipitated cellulose were washed sufficiently with water, air-dried, vacuum dried, then measured in weight. The solubilities with respect to an alkali were calculated using the weights as the undissolved portions. As a result, the solubilities of the cellulose 1, cellulose 2, and cellulose 3 with respect to an alkali were 98%, 92%, and 86%, respectively.

On the other hand, 100 gram portions of these celluloses were dissolved in 1900 gram portions of 9.1% by weight aqueous solutions of sodium hydroxide at 4° C. using a homogenizer to obtain dopes. These dopes were filtered using two 200 mesh metal nets and two polyamide nonwoven fabrics, but the dope comprised of the cellulose 3 as a raw material caused tremendous clogging and could not be filtered. Therefore, the dope of the cellulose 3 could not be used as a spinning stock solution, so the spinning was experimented with using only the cellulose 1 and cellulose 2 dopes. For the spinning nozzles, use was made of ones with 0.08 mm$\phi$ holes. Extrusion was performed from an extruder equipped with a gear pump at an extrusion rate of 10 ml/min into a 25% by weight aqueous solution of sulfuric acid of −7° C. (immersion lengths of 60 cm). The fibers were taken up by a first Nelson roll at 15 m/min, then at 18 m/min by a second Nelson roll to draw them at a ratio of 1.2 and were sufficiently washed by roll rinsing. Next, they were passed through a hot water bath of 95° C. and adjusted in moisture content to 80% on a third Nelson roll, then were continuously treated by saturated steam of 120° C. and were taken up at 18 m/min. Table 4 shows the physical properties obtained. As is clear from this Example, when the solubility with respect to the alkali is less than 90%, filtration is difficult and a spinning dope cannot be obtained, but when 90% or more, the fibers are sufficiently practical in view of the spinnability and fiber physical properties. Further, as understood from Table 4, the higher the solubility with respect to an alkali, the higher the physical properties of the fiber tend to be.

TABLE 4

Physical Properties of Resultant Fiber

|  | Cellulose 1 | Cellulose 2 |
|---|---|---|
| Dry strength (g/d) | 2.19 | 1.82 |
| Dry elongation (%) | 10.4 | 9.9 |
| Wet strength (g/d) | 0.85 | 0.72 |
| Wet modulus (g/d) | 9.4 | 8.0 |

Examples 11 to 21

One hundred grams of the alkali soluble cellulose prepared according to the method of Example 1 were dissolved in 1900 g of a 5.6% by weight aqueous solution of sodium hydroxide at −5° C. using a homogenizer to obtain a uniform dope. The solubility of the cellulose was 99%. The resultant dope was filtered using two 300 mesh metal nets, then was allowed to stand to be degassed. The result was used as the film stock solution. This film stock solution was flow-cast on a glass plate using a 1 mm thickness casting applicator, then this was immersed for 5 minutes in a −5° C. coagulating bath having the composition shown in Table 5 and then was taken out and drawn at a ratio of 1.20 by a hand stretcher. This was then fully rinsed with cold water at 5° C. The rinsed film was sandwiched between filter paper and dried in an autoclave at 105° C., then the strength and elongation were measured. The results obtained are shown all together in Table 5. Further, the strength and elongation were measured using a tensile tester "Tensilon" made by Toyo Baldwin. The strength of the film was on a par with the commercially available cellophane and could be said to be sufficiently practical.

TABLE 5

Relationship Between Film-Forming Conditions and Physical Properties of Film

| Ex. | Composition of coagulating bath | Drawing ratio | Strength (kg/mm$^2$) | Elongation (%) |
|---|---|---|---|---|
| 11 | Polyphosphoric acid 60% aq. | 1.1 | 1260 | 40 |
| 12 | Polyphosphoric acid 60% aq. | 1.2 | 1310 | 28 |
| 13 | Polyphosphoric acid 60% aq. | 1.3 | 1400 | 20 |
| 14 | Nitric acid 68% aq. | 1.2 | 980 | 40 |
| 15 | Sulfuric acid 65%/metaphosphoric acid 20% aq. | 1.2 | 1420 | 25 |
| 16 | Sulfuric acid 20% aq. | 1.2 | 1290 | 35 |
| 17 | Sulfuric acid 60% aq. | 1.2 | 1250 | 40 |
| 18 | Hydrochloric acid 30% aq. | 1.2 | 1120 | 25 |
| 19 | Phosphoric acid 85% aq. | 1.2 | 1280 | 30 |
| 20 | Acetic acid 85% aq. | 1.2 | 1170 | 25 |
| 21 | Acetic acid 99% aq. | 1.2 | 1240 | 25 |

Example 22

Cellulose was prepared and dissolved by the same method as in Example 1 to obtain a spinning stock solution. The spinning nozzle, with 100 holes of 0.08 mm$\phi$ was used. The solution was extruded from an extruder equipped with a gear pump at an extrusion rate of 50 ml/min into a 20% by weight aqueous solution of sulfuric acid (immersion length 52 cm) of −8° C. The fiber was taken up by a first Nelson roll at 80 m/min, then the circumferential speed of the second Nelson roll was made 112 m/min to draw the fiber at a ratio of 1.4. The fiber was sufficiently washed by roll rinsing. Next, the fiber was dried by heating by a metal roll of 110° C. and taken up on a bobbin at a speed of 112 m/min. The resultant cellulose fiber was continuously treated by saturated steam of 120° C. The treatment time was 4 seconds and a constant length was treated. Table 6 shows the physical properties before and after the treatment with saturated steam. As is clear from the Table, even with just ordinary heat treatment by a metal roll, sufficiently practical physical properties are observed, but with further heat treatment using saturated steam, the wet strength is improved and the practical value as a fiber is enhanced.

TABLE 6

Difference of Physical Properties Caused by Presence/Absence of Saturated Steam Treatment

| Presence/absence of saturated steam treatment | None | Yes |
|---|---|---|
| Dry strength (g/d) | 2.09 | 2.14 |
| Wet strength (g/d) | 0.82 | 0.90 |
| Wet elongation | 10.2 | 9.1 |

Examples 23 to 29

Cellulose was dissolved by the same method as in Example 4 to obtain a spinning stock solution. The spinning stock solution was extruded using an extruder equipped with a gear pump from a nozzle having 100 holes of from 0.05 to 0.15 mmφ into a coagulating bath comprised of a 20% by weight aqueous solution of sulfuric acid at an extrusion rate of 30 ml/min. That is, the number of holes of the spinning nozzle was fixed to 100 and the hole diameters were changed from 0.05 mmφ to 0.15 mmφ and the draft ratios were changed from 0.4 to 3.5. The temperature of the coagulating bath was −13° C. The fibers were coagulated under conditions of an immersion length of 60 cm, then were drawn by ratios of 1.0, 1.15, and 1.3 between two Nelson rolls, then were passed through a rinsing step, were heat treated on a 120° C. hot roll, then were taken up on bobbins at 60, 69, and 78 m/min in accordance with their drawing ratios. Further, constant lengths of parts of the obtained fibers were placed in an autoclave and heat treated for 5 minutes with saturated steam having a temperature of 125° C. As is clear from this Table 7, it is learned that by applying drawing to the drawable coagulated gel, the wet strength is strikingly improved. On the other hand, in the case of the draft, which has been used as a measure of the drawing in wet spinning (ratio between the linear speed of extrusion and the speed of the next takeup after leaving the coagulating bath), almost no improvement is seen in the wet strength even when changed from 0.39 to 3.5. This suggests that there is no substantial drawing just by changing the draft and that the substantial drawing effect works for the first time after a dynamic force is made to act on the drawable coagulated gel. Further, the wet strength shows the value commonly used for fibers useful even with just heat treatment, but it was learned that higher values are obtained if steam treatment is further performed.

TABLE 7

Relationship Between Drawing Ratio and Wet Strength

| | Ex. no. | | | | | | |
|---|---|---|---|---|---|---|---|
| | 23 | 24 | 25 | 26 | 27 | 28 | 29 |
| Nozzle hole diameter (mmφ) | 0.05 | 0.06 | 0.08 | 0.10 | 0.11 | 0.12 | 0.15 |
| Draft ratio | 0.39 | 0.57 | 1.0 | 1.57 | 1.90 | 2.3 | 3.5 |
| Wet strength (g/d) | | | | | | | |
| Drawing ratio 1.00 | 0.44 | 0.45 | 0.47 | 0.47 | 0.49 | 0.49 | 0.50 |
| | 0.51 | 0.53 | 0.58 | 0.59 | 0.59 | 0.60 | 0.60 |
| Drawing ratio 1.15 | 0.63 | 0.67 | 0.70 | 0.69 | 0.70 | 0.70 | 0.74 |
| | 0.68 | 0.71 | 0.76 | 0.75 | 0.76 | 0.77 | 0.79 |
| Drawing ratio 1.3 | 0.77 | 0.81 | 0.83 | 0.81 | 0.82 | 0.81 | 0.80 |
| | 0.82 | 0.88 | 0.88 | 0.87 | 0.87 | 0.87 | 0.85 |

In the rows on wet strength, the top rows indicate only heat treatment, while the bottom rows indicate the values after further treatment with steam.

Industrial Applicability

The present invention has the advantage of being able to provide a process which, when producing a cellulose shaped article with excellent physical properties from a dope comprised substantially of cellulose, an alkali, and water, is free in terms of its process from the generation of waste gas or the danger of explosion during the molding process and further is free of environmental pollution from the waste gas etc. Further, in terms of physical properties, it can give cellulose shaped articles having mechanical properties of the same extent as existing fibers and films, which was difficult in the prior art for obtaining cellulose shaped articles having excellent physical properties from a dope comprised substantially of cellulose, an alkali, and water. In addition, the mechanical properties in the wet and moist state (wet modulus of elasticity and wet strength) are also improved.

It is claimed:

1. A method for producing a cellulose shaped article by causing cellulose dope to coagulate in an aqueous acidic solution having a temperature ranging from about the freezing point of said acidic solution to less than 20° C. wherein said dope is substantially composed of an alkali soluble cellulose and an aqueous alkali solution having an alkali concentration of 5 to 15% by weight, and wherein the solubility of the alkali soluble cellulose with respect to said aqueous alkali solution is at least 90%, then drawing the resultant solid 1.05 fold to less than 2.0 fold followed by performing heat treatment on said resultant solid in the presence of a plasticizer to obtain a cellulose shaped article.

2. A method according to claim 1, wherein the amount of said plasticizer is 10% to less than 100% by weight with respect to said cellulose.

3. A method as claimed in claim 1, wherein the aqueous acidic solution is a 5 to 80% by weight aqueous solution of sulfuric acid.

4. A method as claimed in claim 1, wherein the heat treatment is treatment using steam.

5. A method as claimed in claim 1, wherein the cellulose shaped article is in the form of a fiber.

6. A method as claimed in claim 1, wherein the cellulose shaped article is in the form of a film.

* * * * *

UNITED STATES PATENT AND TRADEMARK OFFICE
CERTIFICATE OF CORRECTION

PATENT NO. : 5,401,447
DATED : March 28, 1995
INVENTOR(S) : TOSHIHIKO MATSUI, ET AL.

It is certified that error appears in the above-identified patent and that said Letters Patent is hereby corrected as shown below:

Title page, item [54] and col. 1,
In the title, line 1, "CELLUOSE" should be --CELLULOSE--.

Signed and Sealed this

Eleventh Day of July, 1995

Attest:

BRUCE LEHMAN

Attesting Officer     Commissioner of Patents and Trademarks